No. 785,640. PATENTED MAR. 21, 1905.
W. SILVER.
SHEEP SHEARING MACHINE.
APPLICATION FILED SEPT. 27, 1904.

No. 785,640. PATENTED MAR. 21, 1905.
W. SILVER.
SHEEP SHEARING MACHINE.
APPLICATION FILED SEPT. 27, 1904.

Witnesses
Inventor
William Silver

ATTORNEYS

No. 785,640. PATENTED MAR. 21, 1905.
W. SILVER.
SHEEP SHEARING MACHINE.
APPLICATION FILED SEPT. 27, 1904.

Witnesses
H. M. Kuehne
J. P. Newman

Inventor
William Silver

ATTORNEYS

No. 785,640.  
PATENTED MAR. 21, 1905.  
W. SILVER.  
SHEEP SHEARING MACHINE.  
APPLICATION FILED SEPT. 27, 1904.  
6 SHEETS—SHEET 5.

Witnesses  
H. M. Kuehne  
J. S. Newman

Inventor  
William Silver  
By Richard &c.  
ATTORNEYS

No. 785,640. PATENTED MAR. 21, 1905.
W. SILVER.
SHEEP SHEARING MACHINE.
APPLICATION FILED SEPT. 27, 1904.

Witnesses
H. M. Kuehne
J. P. Newman

Inventor
William Silver
By Richards
ATTORNEYS

No. 785,640. Patented March 21, 1905.

UNITED STATES PATENT OFFICE.

WILLIAM SILVER, OF TAMWORTH, NEW SOUTH WALES, AUSTRALIA.

SHEEP-SHEARING MACHINE.

SPECIFICATION forming part of Letters Patent No. 785,640, dated March 21, 1905.

Application filed September 27, 1904. Serial No. 226,171.

*To all whom it may concern:*

Be it known that I, WILLIAM SILVER, engineer, a subject of the King of Great Britain and Ireland, residing at Tamworth, in the State of New South Wales, Commonwealth of Australia, have invented new and useful Improvements in Sheep-Shearing Machines, of which the following is a specification.

My invention relates to machine sheep-shears to which power is conveyed by a flexible or jointed shaft; and it consists in an improved construction of parts in the type of such machine in which a cutter-bar is supported centrally in a bearing in which it is vertically adjustable to vary the tension and is supported at its rear end so as to vibrate in a fixed plane, power being conveyed to the rear end of said lever by the operation of a pin overhung on a rotating disk, said pin taking between cheeks on said lever.

The main feature of novelty and utility in my improved construction of sheep-shearing machine is in the bearing in which the vibrating lever is supported, which bearing is adapted to completely close the front end of the case, so as to prevent the entrance of dust. Subsidiary parts of the invention refer to the mechanism for adjusting the tension upon the cutter and for inclosing the universal joint at the tail end of the machine. In an alternative form shown the tension is applied at the fulcrum through the medium of a bearing-plate.

In the annexed drawings.

Figure 17:
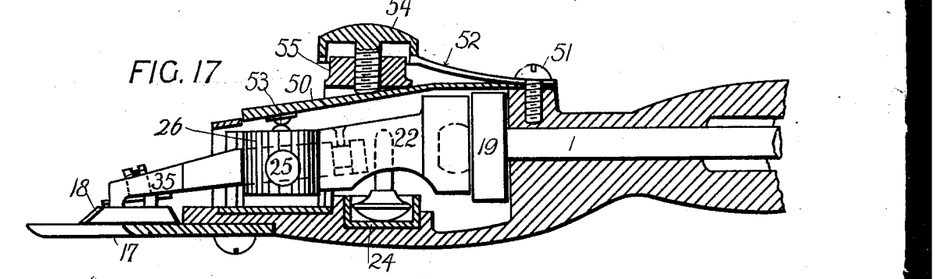
Fig. 17 is a longitudinal sectional elevation through the forward part of the machine.
Figure 18:
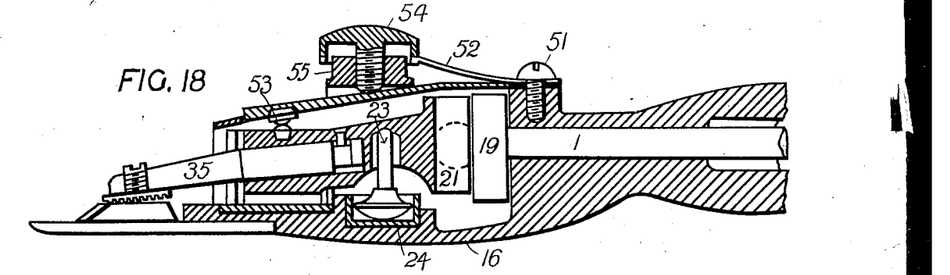
Fig. 18, another longitudinal section through same.
Figure 19:
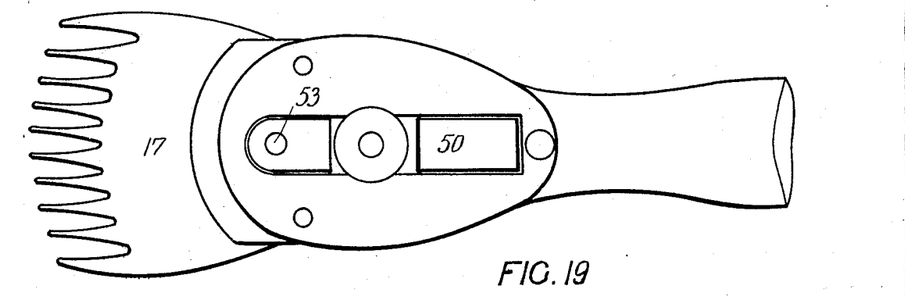
Fig. 19, a top plan with tension-cap removed.
Figure 20:
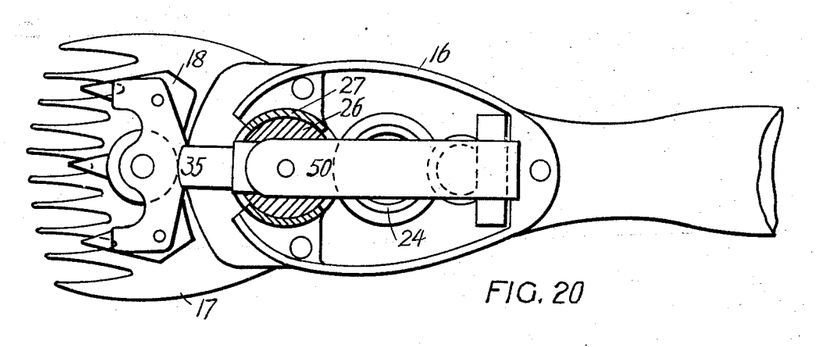
Fig. 20, a sectional top plan with top of cover removed.
Figure 21:
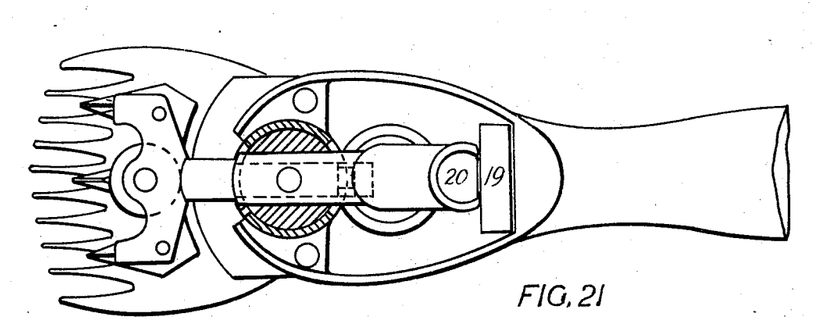
Fig. 21, a sectional top plan with top of cover and bearing-plate removed, and Fig. 22 a transverse section through fulcrum.
Figure 22:
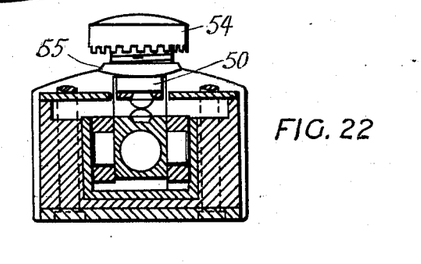

The detail of construction shown in Figs. 6 to 15 is applicable to the original design and also to the modification thereof. In Figs. 17 and 18, however, the center spring-plate 43 of the tension-fork is omitted and the toothed head of the adjusting-screw made to bear directly on the center prong of the cutter.

The cutter-plate and the comb-plate are of the form ordinarily used in machine sheep-shears.

Figure 16:
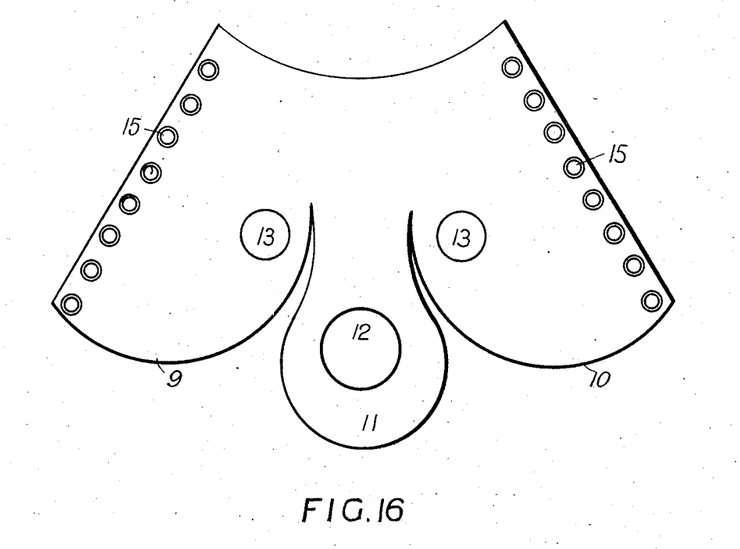
Fig. 16, a plan of leather tail-guard, showing method of cutting same from a single piece, and, referring to the modified construction.

1 is the rotating shaft of the machine, to which power is conveyed through the universal gear-wheels 2 and 3, carried in the sleeves 4 and 5, which are jointed at 6. The coupling of the flexible or jointed shaft is attached to the sleeve 5 at 6 by means of a screw or bayonet coupling, the core of the shaft taking into the protecting end 7 of the tail-shaft 8 by means of any suitable connection. It is usual to protect the universal joint at the tail of the machine by means of a leather guard. The improved form of guard which I employ is shown in Fig. 16. It is cut from a single piece of leather into two wings 9 and 10 and a central tongue 11 through the aperture 12, in which the sleeve 5 is passed. The eyes 13 are adapted to the screw-heads of the joints 6. The guard is secured about the conical sleeve 4 by means of lacing 14, reeved through eyelets 15.

The machine-case 16 carries the comb-plate 17 at its forward end in the usual way, and the cutter-plate 18 is adapted to vibrate to and fro across the comb-plate, so as to make a scissors-like action with the prongs of the same.

19 is a disk on the inner end of the shaft 1. It carries eccentrically a pin upon which a spherical roller 20 is mounted. This spherical roller works between the jaws 21 of the lever-stock 22, which is supported near its rear end on a spherical rocker 23, working in a cup 24 in the bottom of the case 16. At the fulcrum the stock 22 is provided with trunnions 25, to which cylinder segmental cheek-pieces 26 (shown separately in Figs. 11 and 12) are fitted to form, as it were, a hub at the center of vibration. These segmental cheek-pieces set themselves in the bearing 27, (shown in Figs. 13 to 15,) so as to always work truly therein irrespectively of the cant of the stock 22. At the center the conical or pointed shoe 28, carried in the lower end of the thumb-nut 29, bears, so as to apply pressure (tension) to the lever. The edge of the thumb-nut 29 is cupped over, as shown at 30, and tapped to work on the screw-head 31 of the casing-cap 32. This head 31 is bored to fit the neck of the nut 29, so as to make the same run true.

33 is an oil-hole, which is continued through a slot in the base of the pin 28 to allow the oil-service to the bearing-point of said pin 28. The bearing 27 is fitted tightly into a seating formed for it in the jaws 33× of the case 16. The cheeks of the case 16 extend forward and are continued above to form a lip 34. It will be seen that the construction at this place is such that at whatever angle the lever may lie the front of the case is always completely closed and it is impossible for wool or dust to enter same. The stock 22 is bored to provide a seating for the self-adjusting head of the lever. This self-adjusting head is a fork 35, having two bearing-fingers 36, which press upon the outer prongs of the cutter-plate, and whose rear part consists of a cylindrical stem 37, fitted to the cavity in the stock 22, so as to be rotatable therein. The rear end 38 of the stem is formed with a turned neck and slot coacting with a pin 39, acting as a bayonet-catch to prevent withdrawal while the head is in its working position. The head may be withdrawn at any time by turning it round bottom up in its bearing and withdrawing it, in which position the keyway is in line with the pin 39. The fork 35 is provided with dowel-pins 40, which fit into holes in the cutter. It has also an adjusting device whereby the pressure, as between the middle and the two outer prongs of the cutter, may be adjusted. This adjusting device consists of a screw 41, working in a tapped hole in the center part of the fork 35, and a broad head 42 on said screw, whose lower side is serrated radially. Below the screw-head 42 is a plate 43 of light spring-steel secured at the rear end by a screw 44 to the wrist of the fork. The forward end of this plate is serrated, so as to interlock with the serrations on the screw-head 42, and it may have a thickened bearing-point 45. The serrations may be of rather fine gage, so as to permit very exact adjustment, when the plate 43 is not in use, as in the arrangement shown in Figs. 17 and 18. The screw-head is formed with coarse serrations only because each serration must be wide enough to lock on the top of the cutter-prong, which is of considerable width, and inferior adjustment is therefore obtained when the plate 43 is omitted, while a very fine adjustment can be obtained when the serrations are formed very closely together and the plate 43 is used.

In a design of machine heretofore used by me various devices were employed operating by means of a screw in the center portion of the fork to effect an adjustment of the bearing, as between the three points thereof acting on the cutter; but the radially-serrated screw-head, more particularly when arranged to work in coöperation with the spring-plate 43, produces a substantially improved effect, because an exact adjustment is obtainable, while it is impossible for the adjustment to alter by reason of vibration in the working of the machine.

46 is a catch-spring for locking the nut 29 by engaging the milled rim of same.

Figure 1:
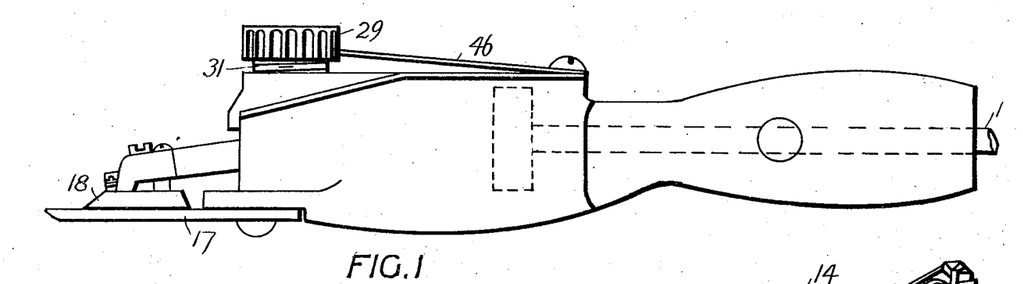
Figure 1 is an exterior side elevation of the machine with the rear sleeve removed.
Figure 2:
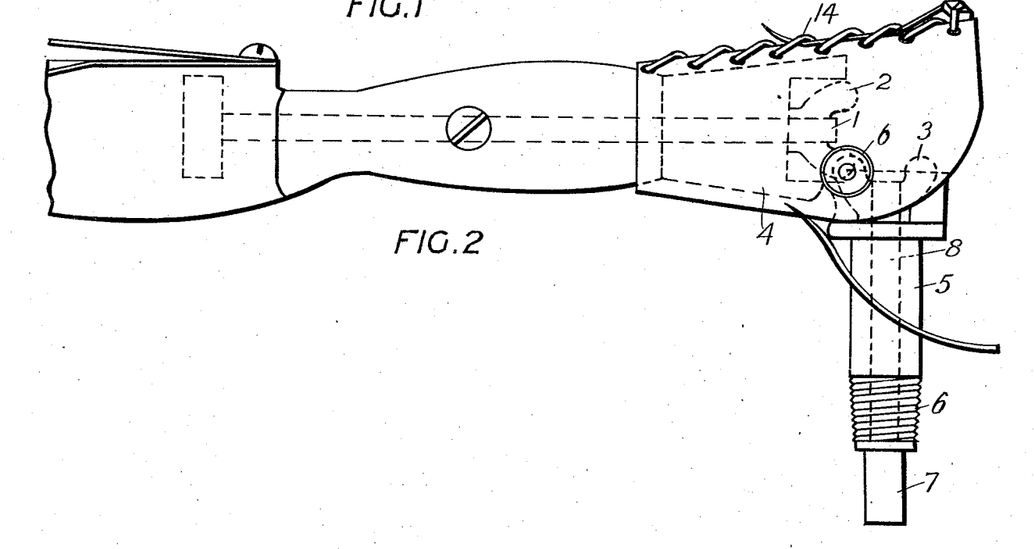
Fig. 2, a similar side elevation showing the tail of the machine with its guard, but omitting the front end.
Figure 3:
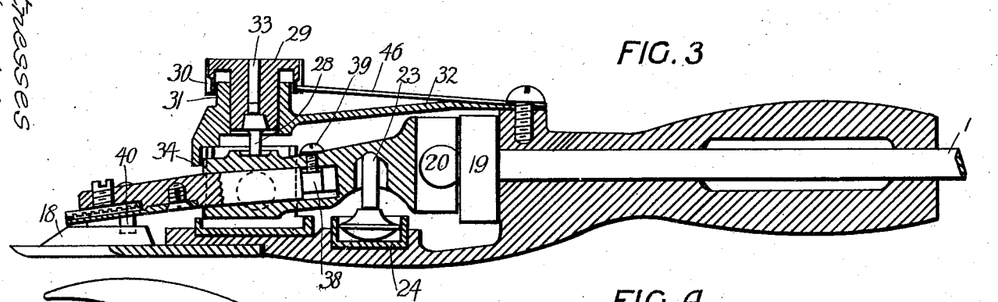
Fig. 3, a central longitudinal section.
Figures 4, 5:
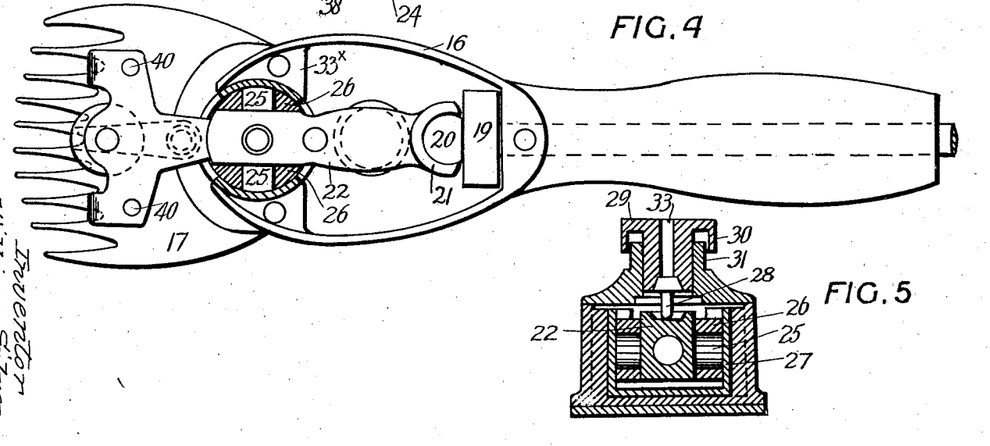
Fig. 4, a horizontal section and top plan, the lid of the case and tension-screw being removed.
Fig. 5, a transverse section at the fulcrum.
Figures 6, 10:
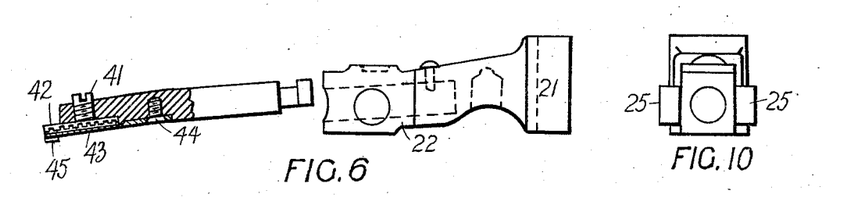
Fig. 6, a sectional side elevation of the lever with detachable front end drawn out.
Fig. 10, a front end elevation of the stock of the lever, which forms the right-hand portion of Fig. 6.
Figures 7, 8, 9, 11, 12, 13, 14, 15:
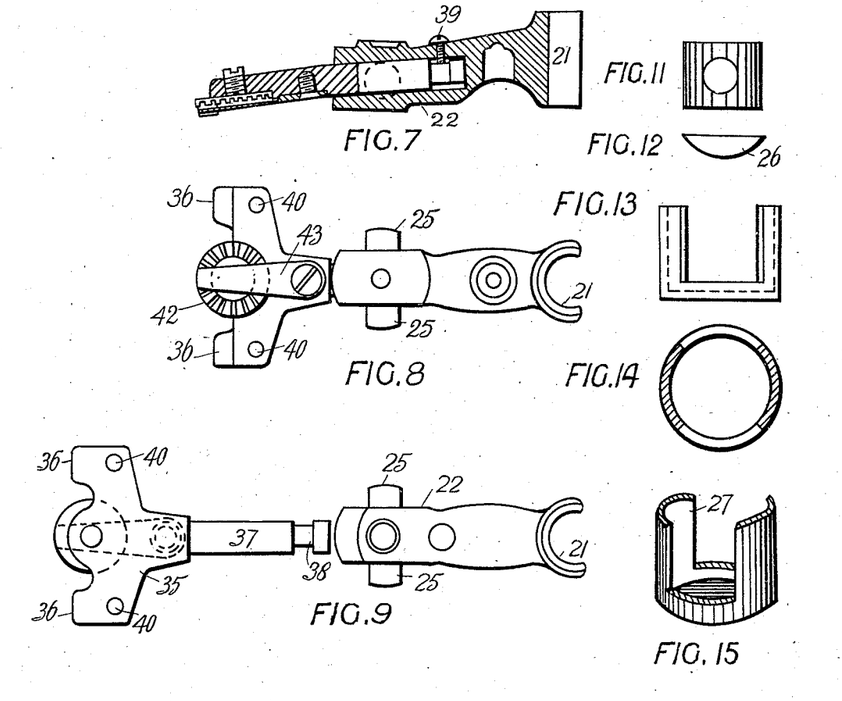
Fig. 7, a longitudinal section through lever.
Fig. 8, a bottom plan of lever.
Fig. 9, a top plan of same as it appears when in position shown in Fig. 6.
Fig. 11, a side elevation of one of the cheek-pieces, which is carried on the side of the lever-stock to form the hub thereon to fit the bearing.
Fig. 12, a plan of segmental piece shown in Fig. 11.
Fig. 13, a front elevation of the bearing.
Fig. 14, a horizontal section through same.
Fig. 15, a perspective view of same.

In operation the cutter is inserted, as shown in Figs. 1 and 3, and the screw 41 turned until the proper adjustment as between the three points of bearing is obtained, the thumb-nut 29 being meantime screwed down to obtain the proper degree of tension. Power being now applied the circular portion of the spherical washer 20 in the jaws 21 produces a vibration of the lever-stock 22 about the axial line of the bearing 27. This vibratory motion is conveyed through the forward end of the lever and its fork 35 to the cutter, reciprocating the same to and fro across the comb-plate 17 once in each revolution of the shaft 1. As the cutter 18 becomes worn the pressure of same on the comb-plate is restored by screwing down the nut 29. This screwing down of the nut acts to cant the lever about its point of support on the rocker 23. In this adjustment the segmental cheek-pieces 26 fall into line and work truly in the bearing 27. They always maintain their true working line in that bearing in any position between extremes to which the lever 22 may be canted, and at all working positions the mouth of the casing is kept completely closed, as before explained.

Referring now to Figs. 17 to 22, it will be observed that apart from the omission of the spring-plate 43 the only difference of construction is in the addition of the riding plate 50 and the application of the tension thereto at a point rearward of the fulcrum. This riding plate 50 is flexible and is carried at the back of the case by a screw 51, which secures also the tension-nut-locking spring 52, or it may be loosely seated in a cavity in the case-cover. There is a point-bearing 53 to reduce friction at the fulcrum. The forward end of the case, as shown in Figs. 17 and 18, is not so perfectly closed as in the construction shown in the earlier figures; but it may be closed almost precisely in the same way, so as to efficiently exclude dust. The tension-screw 54 works through a bridge 55, forming part of the cover-plate of the case. In operation of this modified design the action is precisely the same as in the earlier designs, excepting only that a less fine adjustment is possible as between the center and outer members of the fork and also the tension is applied through the riding plate 50, which lies intermediate between the point of the screw 54 and the conical points 53, by which it is taken on the center of motion of the lever.

There is no novelty in the mechanism for transmitting rotary motion and transforming the same into vibratory motion in the case of the machine, nor is there any novelty in the rocker device 23 for supporting the rear end of a vibrating lever capable of vertical adjustment at the fulcrum, so as to vary the position of its forward end to regulate the tension. The mode of mounting the lever with segmental cheek-pieces, forming a self-adjusting hub to work within a cylindrical bearing, is, however, broadly new, as is also the device for adjusting the tension on the center prong of the cutter by means of a broad-headed screw radially serrated to engage with said center prong of the cutter either directly or through an intermediate plate.

What I claim as my invention, and desire to secure by Letters Patent, is—

1. In a sheep-shearing machine, a main lever supported at the rear end and set up between two segmental pieces to which it is trunnioned, said pieces with the lever passing therethrough forming a hub rotatable vibratorily in a journal or bearing in the machine-case and capable of sliding vertically therein to allow for alternation of tension and wear and tear on the cutter-plate, the tensional pressure being applied through points to the lever upon its axis of vibration, substantially as described.

2. In a sheep-shearing machine, a mounting for the fulcrum of the vibrating lever consisting of segmental cheek-pieces 26 movable vertically and rotatable in a vertical bearing 27, substantially as described.

3. In a sheep-shearing machine, a vibrating lever to the stock of which vibratory movement is applied at the back end and which is mounted at its front end in segmental cheek-pieces 26 adapted to bearings 27, in combination with a rear rocker-support and a forward end consisting of a shanked fork capable of rocking motion, carried by the lever, substantially as described.

4. In a sheep-shearing machine a main lever of the first class with rear end supported and moving in a fixed plane and capable of vertical adjustment at the fulcrum to regulate tension, of segmental cheek-pieces (forming a hub) working in a vertical bearing, and tension-applying mechanism consisting of a cone-pointed screw working in the case and acting on said lever at its axial point, substantially as described.

5. In a sheep-shearing machine wherein the lever is of the first class with rear end supported and moving in a fixed plane and capable of vertical adjustment at the fulcrum to regulate tension, mechanism for applying tension thereto consisting of conical points, one of which is on the lever and the other carried by a spring-plate 50 controlled by a thumb-screw 54, substantially as described.

6. In a sheep-shearing machine wherein vibratory motion and tension are applied to a fork acting upon a three-pronged cutter-plate, mechanism for adjusting the tension on the center prong of the cutter consisting of a flexible plate forming the middle finger of the fork and an inverted screw acting thereon and working in the wrist of the fork, the head of said screw being serrated radially and the upper surface of said flexible plate being also serrated to engage with the serrations on the screw-head locking the same to prevent change of tension while the machine is working, substantially as described.

7. In a sheep-shearing machine, a removable fork for conveying vibratory motion and tensional pressure to the cutter, having a serrated disk with screw-stem mounted in the center finger of the fork, adapted to vary the pressure on the center finger of the cutter by screwing adjustment, and provided with a shank with bayonet-catch for retaining same in working position in the lever-stock, substantially as described.

8. In a sheep-shearing machine, in combination with a vibrating lever having tension-adjusting mechanism, a tension-distributing fork 35 with cylindrical shank 37 locked by a bayonet-pin 39 and provided above the center finger with a disk 42 serrated radially to form a lock with corresponding serrations on said center finger and having a screw-stem 41 for adjusting the tensional pressure as between the center and two outer fingers of the fork, substantially as described.

9. In a sheep-shearing machine, the combination of vibrating lever with trunnion-pins 25 fitted to segmental cheek-pieces 26 forming a hub, journals or bearings 27 therefor in the casing, spring-tension plate 50 acted upon by thumb-screw 54, tension-points 53, distributing-fork 35 with cylindrical stem 37, and bayonet-catch, and serrated disk 42 with screw-carrier 41 for justifying the tension on middle finger of the cutter-fork, substantially as described.

10. In a sheep-shearing machine, a vibrating lever carried rearwardly on a rocker and at its fulcrum in a hub vertically movable for tension-adjusting purposes and acted on by a tension-screw working in the machine-case, said hub closing the mouth of the case, substantially as described.

11. For the tail-end universal joint of a sheep-shearing machine, a protecting-gauntlet having a middle tongue adapted to cover the back of the joint-case and two wing-pieces adapted to be laced together to form an upstanding guard for the front and sides of said joint-case, substantially as described.

In testimony whereof I have signed my name to this specification in the presence of two subscribing witnesses.

WILLIAM SILVER.

Witnesses:
L. LUCAS,
W. I. DAVIS.

Correction in Letters Patent No. 785,640.

It is hereby certified that in Letters Patent No. 785,640, granted March 21, 1905, upon the application of William Silver, of Tamworth, New South Wales, Australia, for an improvement in "Sheep-Shearing Machines," an error appears in the printed specification requiring correction, as follows: On page 3, line 51, the word "alternation" should read *alteration;* and that the said Letters Patent should be read with this correction therein that the same may conform to the record of the case in the Patent Office.

Signed and sealed this 12th day of September, A. D., 1905.

[SEAL.]

F. I. ALLEN,
*Commissioner of Patents.*